Aug. 7, 1951  R. C. HOFFMAN  2,563,680
AXLE CONSTRUCTION
Filed Oct. 5, 1949 7 Sheets-Sheet 1

INVENTOR.
Roscoe C. Hoffman.
BY
Harness, Dickey & Pierce.
ATTORNEYS.

Aug. 7, 1951  R. C. HOFFMAN  2,563,680
AXLE CONSTRUCTION
Filed Oct. 5, 1949  7 Sheets-Sheet 2

INVENTOR.
Roscoe C. Hoffman.
BY
Harness, Dickey & Pierce.
ATTORNEYS.

Aug. 7, 1951 R. C. HOFFMAN 2,563,680
AXLE CONSTRUCTION
Filed Oct. 5, 1949 7 Sheets-Sheet 3
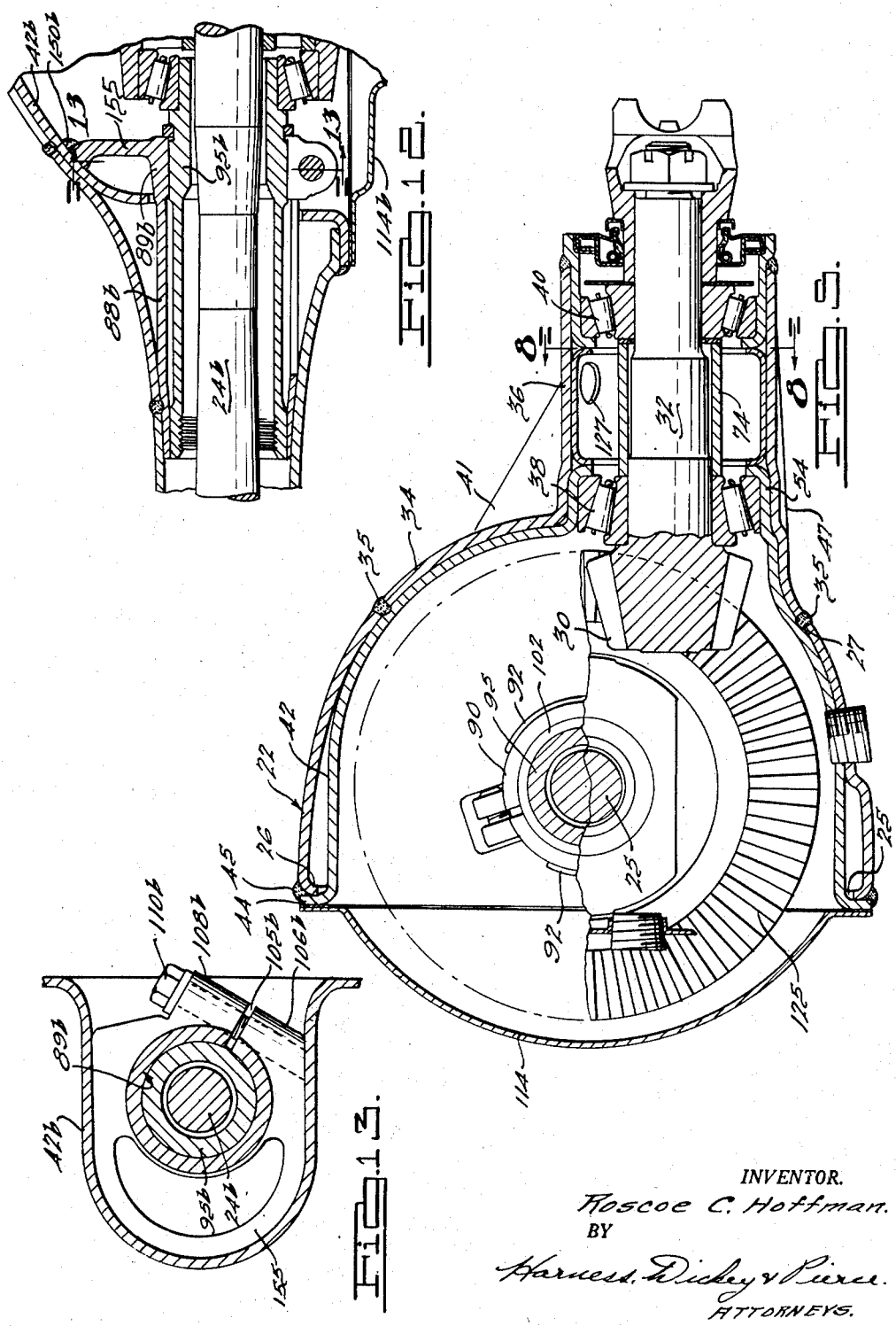
INVENTOR.
Roscoe C. Hoffman.
BY
Harness, Dickey & Pierce
ATTORNEYS.

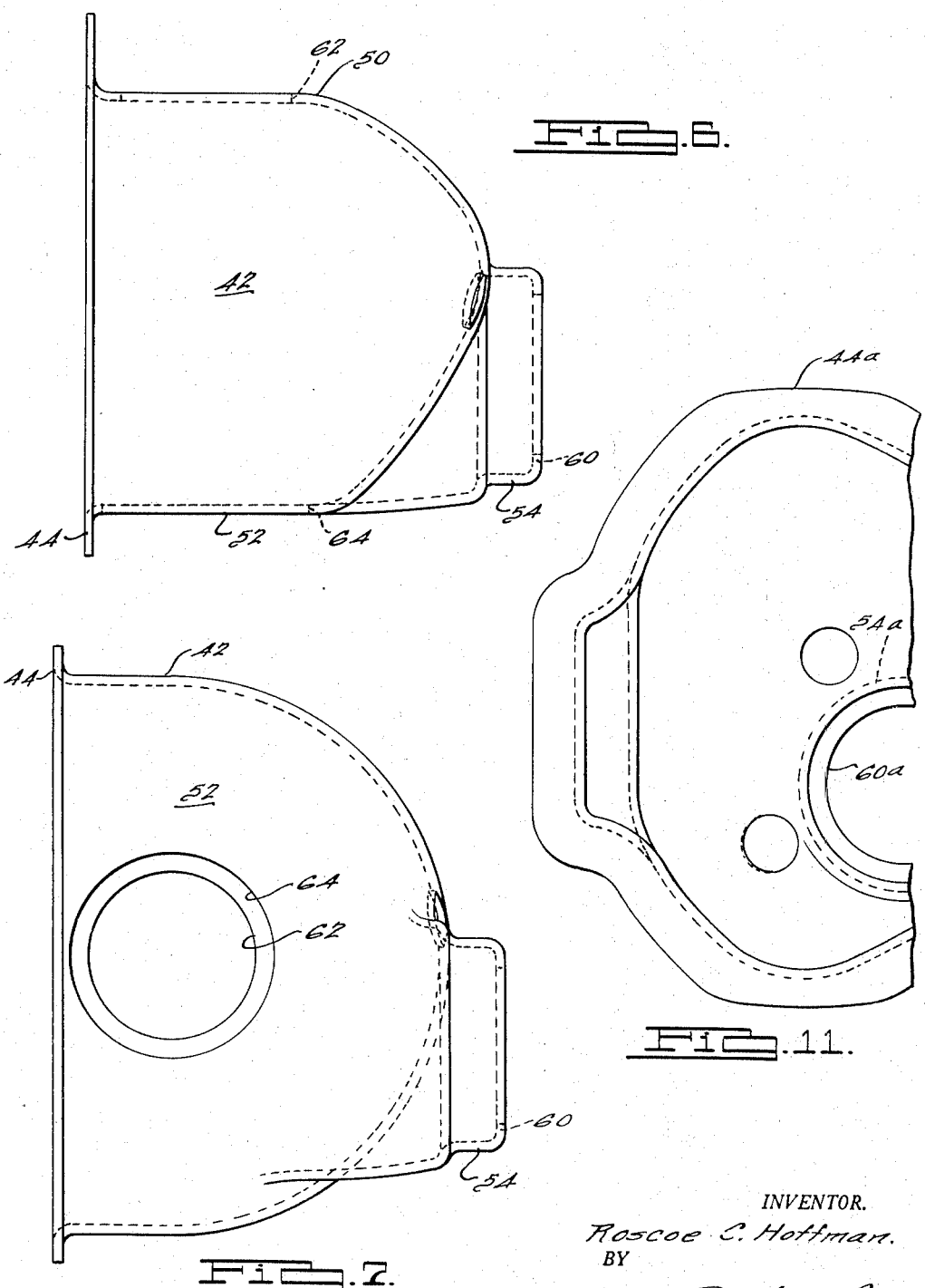

Aug. 7, 1951  R. C. HOFFMAN  2,563,680
AXLE CONSTRUCTION
Filed Oct. 5, 1949  7 Sheets-Sheet 5
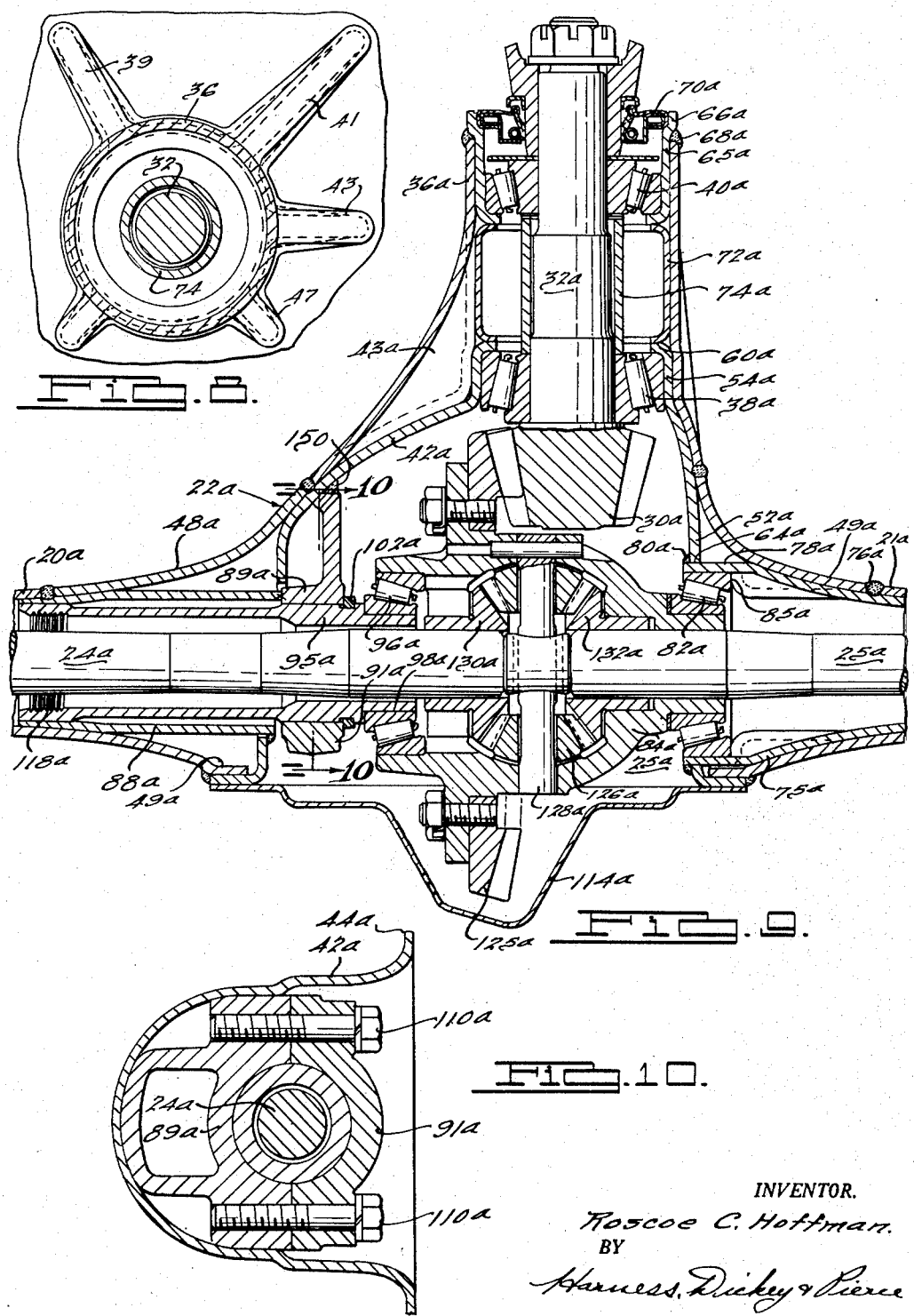
INVENTOR.
Roscoe C. Hoffman.
BY
Harness, Dickey & Pierce
ATTORNEYS.

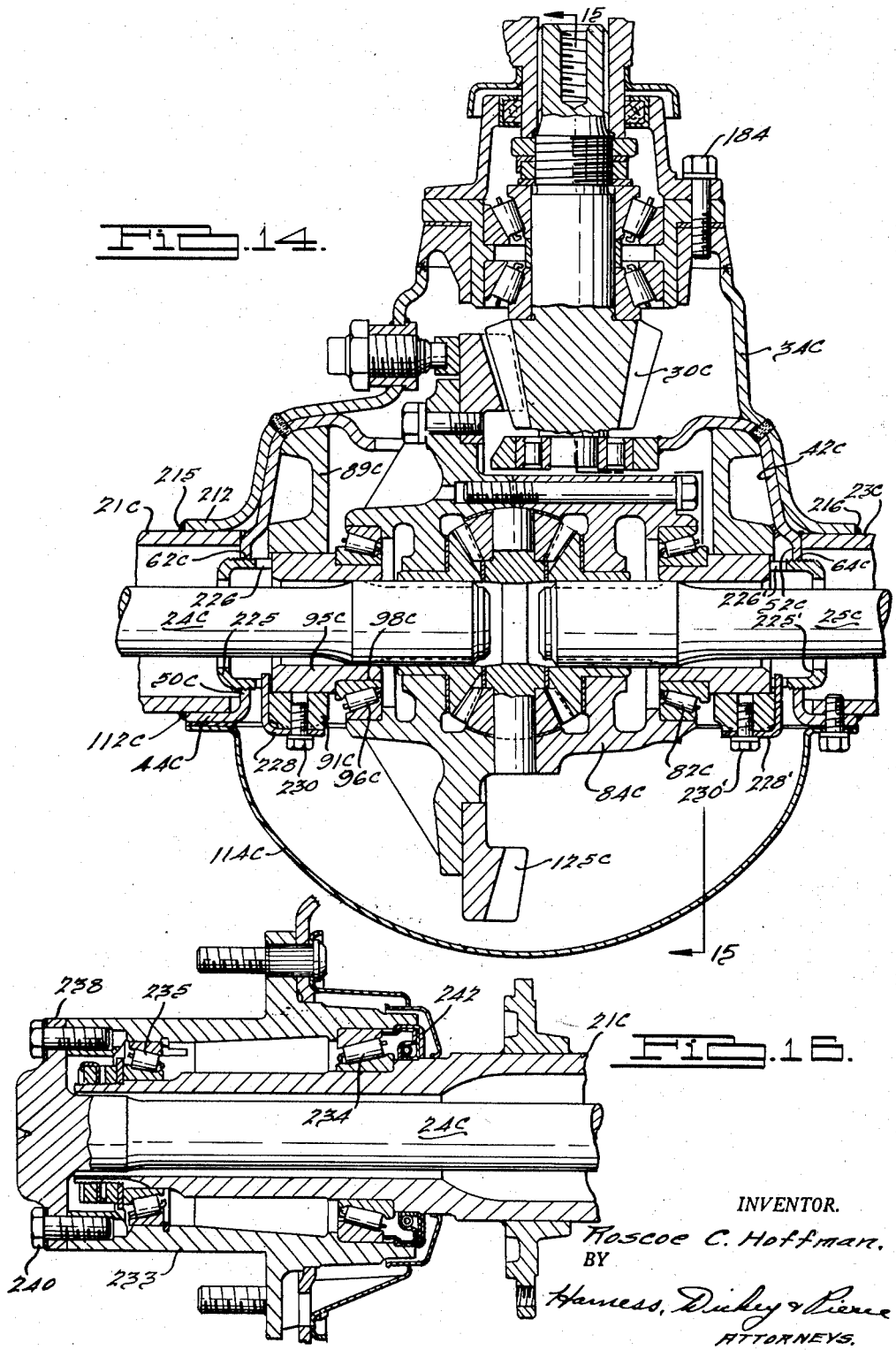

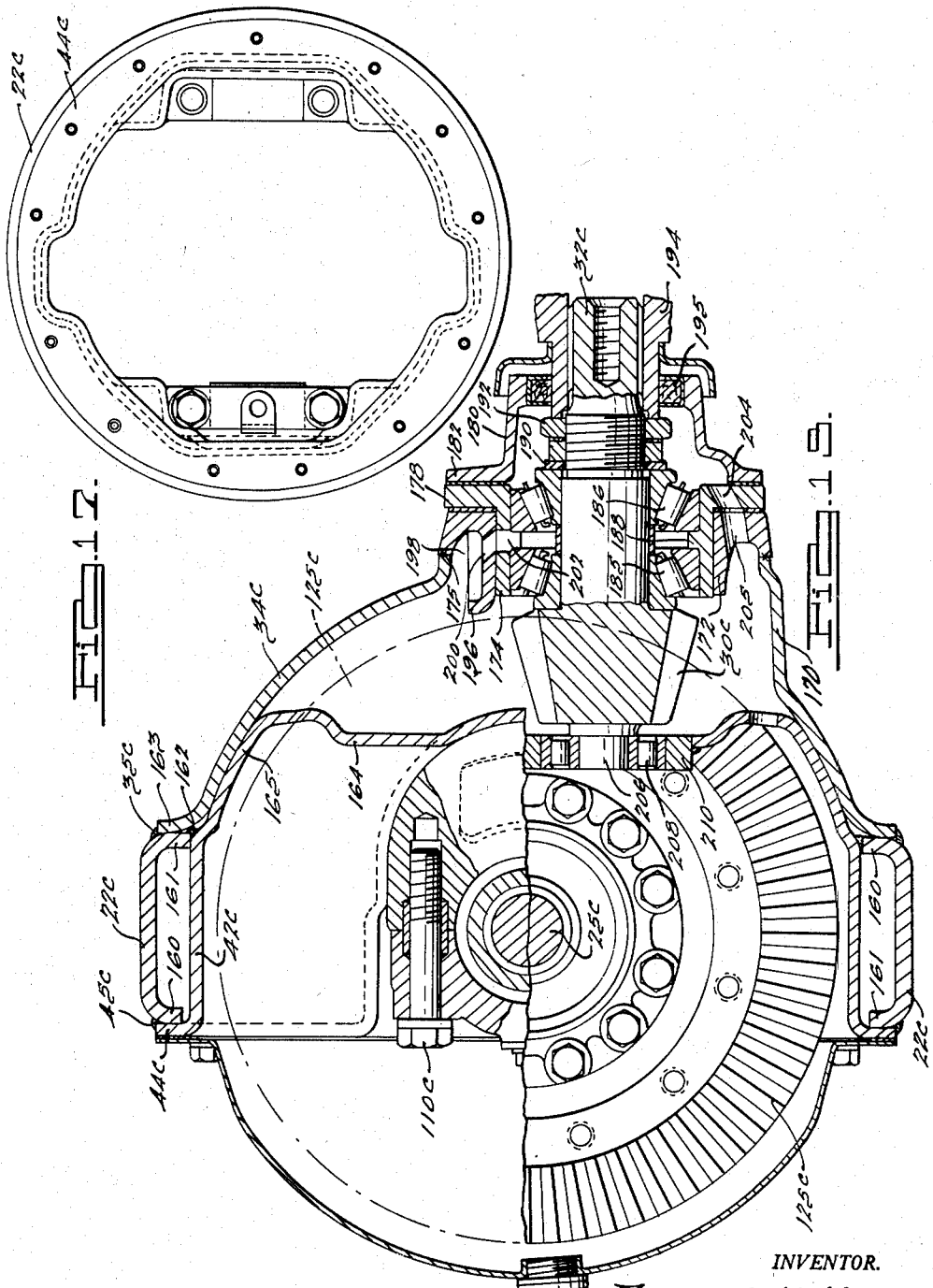

Patented Aug. 7, 1951

2,563,680

UNITED STATES PATENT OFFICE 2,563,680

AXLE CONSTRUCTION

Roscoe C. Hoffman, Detroit, Mich.

Application October 5, 1949, Serial No. 119,669

23 Claims. (Cl. 74—607)

The present invention relates to the construction of driving axles for motor vehicles. The primary objects of the invention may be summarized as comprising the provision of an improved and simplified axle construction, the housing portions and many of the structural elements of which are formed of sheet metal, the sheet metal parts being so contoured and so secured to one another as to provide an assembly which is of less weight and less costly to manufacture than such axle constructions as now fabricated, and which is of increased strength and rigidity.

It is also an object of this invention to provide an improved driving axle construction incorporating unique and simple means for taking up and adjusting clearances between the running parts.

Another object of this invention is to provide an improved axle construction including a housing formed largely of sheet metal parts and which is adapted for heavy duty service, as in trucks and buses, novel trunnion-type bearing supporting means being provided for the driving pinion.

Other objects and advantages of the invention will become apparent upon consideration of the present disclosure in its entirety.

In the drawings:

Fig. 5 is a vertical longitudinal sectional view with parts broken away, taken substantially on the line 5—5 of Fig. 1 and looking in the direction of the arrows;

Figs. 6 and 7 are top and right side elevational views, respectively, of the differential housing liner;

Fig. 8 is a fragmentary section taken substantially on the line 8—8 of Fig. 5 and looking in the direction of the arrows;

Fig. 9 is a view similar to Fig. 1 showing a somewhat modified construction;

Fig. 10 is a cross-sectional view taken substantially on the line 10—10 of Fig. 9 and looking in the direction of the arrows;

Fig. 11 is a fragmentary rear elevational view of the differential housing liner of the embodiment of Figs. 9 and 10;

Fig. 12 is a fragmentary horizontal central sectional view of the adjustable portions of an axle structure incorporating the invention in another somewhat modified form;

Fig. 13 is a cross section taken substantially on the line 13—13 of Fig. 12 and looking in the direction of the arrows;

Fig. 14 is a view similar to Fig. 1 showing another modified construction;

Fig. 15 is a longitudinal sectional view taken substantially on the line 15—15 of Fig. 14 and looking in the direction of the arrows;

Fig. 16 is a diametric longitudinal sectional view of the end portions of the spindle and axle tube elements of the embodiment of Figs. 14 and 15; and Fig. 17 is a rear elevational view of the differential housing portion of the last-mentioned embodiment with the operating components removed.

Figures 1, 2:
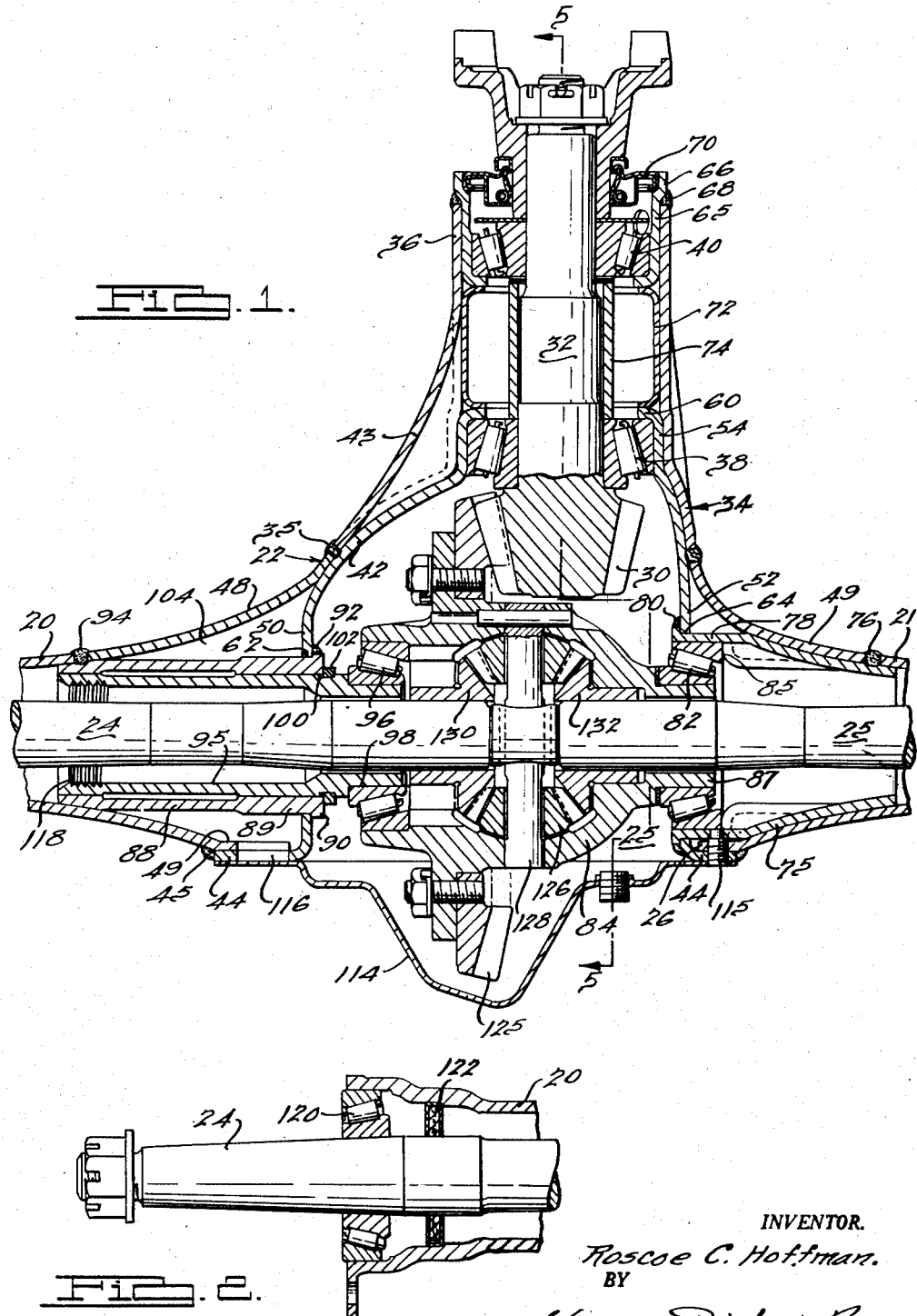
Figure 1 is a horizontal sectional plan view of the principal portions of a driving axle constructed in accordance with the present invention, with the ends of the axle spindles and axle spindle housing tubes broken away.
Fig. 2 is a horizontal sectional plan view of the end portion of one of the axle spindles and its housing tube.
Figure 3:
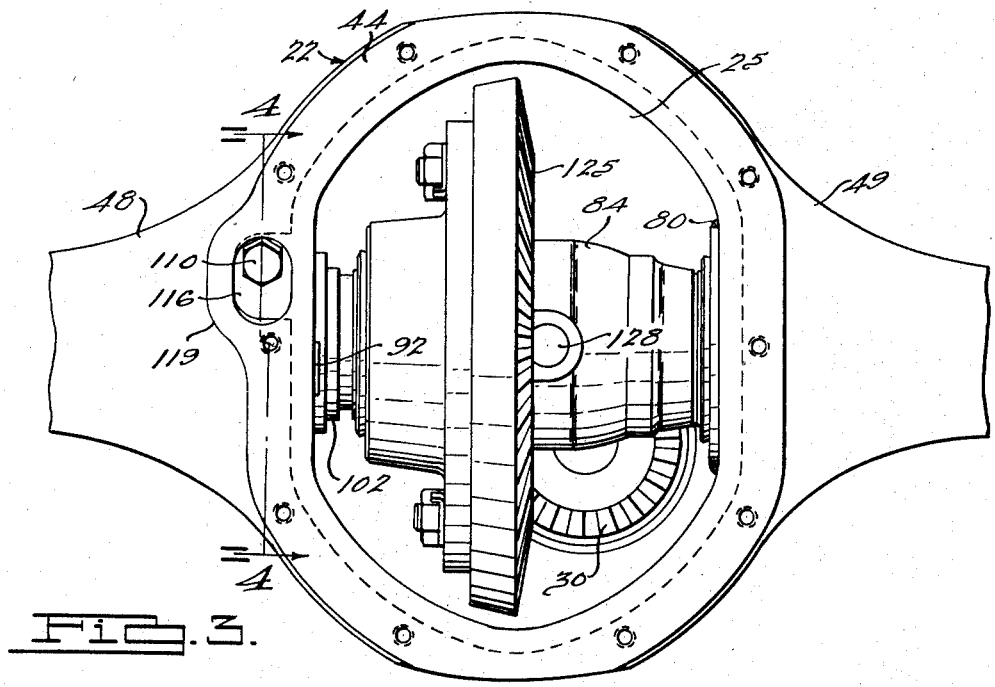
Fig. 3 is a fragmentary rear elevational view of the axle of Fig. 1 with the back cover removed.

Referring now to the drawings, and particularly to Figs. 1–8 inclusive, my improved axle housing structure is of the banjo-type, having generally tubular shaft housing end portions 20, 21 and a banjo differential housing section 22. Such housing structure may be formed either of flat sheet metal stock or from a tube, or from two pieces of tubing, the ends of which are joined upon a vertical plane extending transversely (fore and aft of the vehicle) through the center of the banjo housing. In the preferred construction shown, a single piece of sheet metal is used, long enough to form the entire assembly of both axle tubes and the ring-like banjo housing. Methods of forming such unitary axle housing structures comprising integral banjo and tube sections are known in the art and need not be described in detail here. The parts which constitute the axle housing tubes are formed to complete tubular shape and seam-welded. These are generally designated 20 and 21. The portion which is to constitute the banjo housing is expanded from the central part of the stock. The expanded ring-like banjo section is designated 22, and this will be recognized as similar to such portions of axle housings as heretofore constructed. Ordinarily with front engine, rear-wheel-drive cars, the banjo section 22 will be located approximately centrally of the length of the assembly.

The expanded banjo housing ring portion has substantially parallel front and rear openings of relatively large size, the rear opening 25 being somewhat larger than the front opening 27. The front opening of the banjo portion is located at the line which, when the housing is assembled, is closed by the weld 35. An inturned flange 26 is formed bounding the rear opening. (The terms "front," "rear," "left" and "right" as applied herein relate to the positioning of parts with respect to a vehicle in which the axle is installed.)

A forward extension section serving as a bearing support for the driving pinion 30 and pinion shaft 32 is secured to the front opening 27, such front extension being flared or belled at its rear end as indicated at 34 and contoured to form a continuation of the differential casing portion 22, to the front opening 27 of which it is secured as by means of a seam-weld designated 35. A tubular forwardly directed extension 36 is integral with the belled portion 34 and supports a pair of tapered roller bearing assemblies as 38, 40, which journal the pinion shaft 32. It will be appreciated that the portions 34, 36 may be formed of an integral piece of sheet metal. The belled and bearing supporting tube portions 34—36 may be stiffened and braced with respect to one another by integral folded gussets as 39, 41, 43 and 47. One of these, as 41, serves as an oil channel for conducting oil thrown forwardly by the ring gear 125 to an oil hole 127 (Fig. 5) in the bearing spacer ring 72. Such oil flows downwardly into the spacer ring and overflows both toward the front and rear into, and lubricates, the bearings 38, 40. The arrangement of certain of these parts will presently be considered in greater detail.

A generally cupped reinforcing liner member, also formed of sheet metal and designated 42, is fitted into the banjo section 22 and projects forwardly into the extension portions 34, 36. The reinforcing liner is provided at its rim with an outturned flange 44 which overlaps the inturned flange 26 of the banjo section 22 and is secured thereto by welding as indicated at 45. The reinforcing liner is contoured to fit closely against the interior of the belled section 34 and within the adjacent forwardly projecting parts of the banjo section 22, but the banjo casing diverges angularly outwardly toward the rear away from the liner. Such divergence is relatively slight at the top and bottom, as shown in Fig. 5, but relatively great at the sides, as shown in Fig. 1.

As also indicated in Fig. 1, the sides of the banjo section are provided with gradually tapered or necked portions 48, 49 which join the straight tubular shaft-housing sections 20, 21 to the expanded banjo section 22, and the side portions 50, 52 of the liner 42 bridge the inner ends of the tapered portions 48, 49, such side portions of the liner being flattened and extending substantially perpendicular to the spindle axis. It will be appreciated that the seam-weld 35 also assists in fastening the liner 42 in position.

At its front end, the liner is provided with a relatively short forwardly directed cylindrical embossment 54 which defines a retaining ring for the cup portion of the bearing assembly 38, the forward extremity of the ring section 54 being flanged inwardly, as indicated at 60, to define a locating and thrust shoulder for the bearing. At the sides of the liner cup 42 and in axial alignment with the tubular extensions 20, 21, openings designated 62, 64 are formed in the cup to permit the extension of the axle spindles 24, 25 therethrough and to accommodate other supporting portions presently to be described.

In the forward extremity of the tubular section 36, a tubular cupped sheet metal bearing retainer 65 is fitted, which may be provided as shown with a flared, forwardly directed mouth portion 66 secured as by the weld 68 to the end of the supporting tube 36. The bearing holding cup 65 may also support a lubricant retainer 70 of conventional or any suitable construction. The spacing ring member 72 previously mentioned is also formed of sheet metal and arranged in the tubular portion 36 between the bearing locating portions 54, 65. A spacing sleeve 74 is also carried by the spindle 32 between the inner race or cone portions of the roller bearing assemblies 38, 40.

The tapered neck portion 49 which joins the banjo section 22 to the right-hand tubular extension 21 thereof contains a tubular reinforcing element 75, which is of generally truncated conic form closely fitted therein and secured in position by means which includes one or more puddle welds as 76. At its inner end, reinforcing liner member 75 is provided with a substantially cylindrical inwardly projecting portion 78 which projects through the opening 64 in the flat side portion 52 of the liner 42, to which it is further secured by the peripheral weld 80.

The cylindrical portion 78 serves to house the cup of the right side roller bearing assembly 82 which carries the right side of the differential cage 84. It will be noted that the cage or carrier 84 is formed with a spigot 87 journaled in the cone of bearing assembly 82. The reinforcing insert sleeve 75 is indented at a plurality of peripherally spaced positions to define locating shoulders 85 for the bearing assembly 82. It will be observed that the flattened sidewall portion 52 of the liner cup 42 and the cylindrical portion 78 of tubular insert 75 are disposed substantially perpendicularly to one another, while the tapered portion 49 of the outer casing bridges the angularly disposed parts 52, 78, just referred to, so that when the parts are secured together in the manner described, they effectively brace one another to provide a structure of great rigidty. It will also be recognized that similar portions defining rigidly secured and interbraced parts of triangular section are formed at the juncture of the analogous portions at the left side of the differential housing defined by the flat part 50 of the liner 42 and the tapered part 48 of the outer casing.

The tubular reinforcing and supporting insert sleeve 88 at the left side also extends between the portions 48, 50, in a position to concentrically and spacedly encircle the left spindle 24. Sleeve 88 is inserted from within the liner 42, being projected through the opening 62 and having a terminal flange 90 which projects outwardly to overlie the interior of the portion 50 of liner cup 42, to which it is welded upon a circumferential line which is less than a complete circle, as indicated at 92. The left end of the sleeve 88 is proportioned to bear against the interior of the tapered section 48 of the outer casing, near the outer end of such tapered portion, and is puddle welded thereto as indicated at 94.

Figure 4:
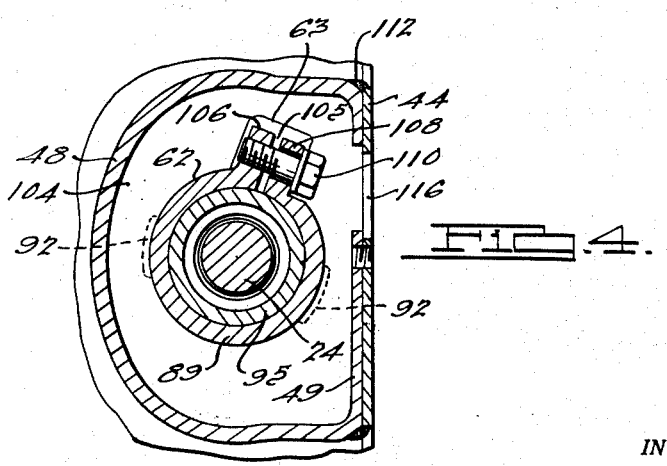
Fig. 4 is a cross-sectional view taken substantially on the line 4—4 of Fig. 3 and looking in the direction of the arrows.

Between the bracing sleeve 88 and the spindle 24, an adjustable bearing supporting sleeve 95 is interposed which is slidably fitted in and supported by the stiffening sleeve 88. The interfitted parts may be machined, and sleeve 95 projects from sleeve 88 into the interior of the differential housing to carry the cone of the left side tapered roller bearing assembly 96 which supports the differential cage 84. The cone portion of the bearing assembly 96 is fitted against a shoulder formed by a reduced portion 98 on the inner end of the sleeve 95. The portion of the sleeve 95 which projects into the differential housing is provided with a peripheral groove 100 located adjacent the inner end of the sleeve 88 and adapted to receive a snap ring 102 which projects outwardly from sleeve 95 and bears against the inner end of the sleeve 88 to positively lock the sleeve 95 against outward movement. Near its inner end and within the annular enclosure 104 defined by the portions 48, 50, the sleeve 88 is peripherally thickened and such thickened portion is split substantially radially as indicated at 105, so that the thickened portion may act as a clamping ring. As best shown in Fig. 4, such thickened clamping ring portion is also provided adjacent the split area 105 with a pair of angularly upwardly and rearwardly extending integral lug portions 106, 108. A clamping screw 110 is engaged with such lug portions to enable tightening and loosening the clamping ring section 89 of the sleeve. The left side opening 62 in the wall 50 of liner cup 42 is notched as indicated at 63 to permit the lug portions 106, 108 to pass therethrough during assembly.

The tapered section 48 of the housing structure is flattened at the rear as indicated at 49 and lies inside the flat back flange 44 to which it is secured by the weld 45. The overlapping portions of the flange 44 and the flattened portions 49 are extended to the left of the rear differential housing opening 25, as indicated at 119 in Fig. 3, and the mating rim flange of the cover 114 is similarly extended. The cover is adapted to be attached in the conventional or any suitable manner as by the screws 115. An opening 116 is formed in the extended overlapping flange portions 44, 49 in alignment with the clamping screw 110, so that access may be had to such screw by removing the back cover 114.

At its outer end, the sleeve 95 is of substantially greater diameter than the spindle 24 and provided with internal threads, as shown at 118. The outer end of the axle tube 20 is flared outwardly to accommodate the wheel bearing assembly 120 and a lubricant seal 122, as shown in Fig. 2. When the wheel and other parts are removed from the spindle 24 and the wheel bearing 120 and lubricant seal 122 are removed, a tube or pipe having external threads at its inner end conforming to threads 118 may be projected into the tubular housing portion 21 to engage the threads 118. Such a tube should of course be long enough to project from the outer end of the axle tube, when so threadedly interengaged with the sleeve 95, and it will be seen that when the snap ring 102 is removed, the sleeve 95 may in this manner be pulled out through the axle tube, or moved in or out with respect to the differential housing for adjustment. In this connection, it will be noted that the snap ring groove 100 is somewhat wider in an axial direction than the ring 102, so that rings of different thicknesses may be substituted to adjust the longitudinal positioning of the sleeve 95.

The differential components are indicated as of substantially conventional construction, although this will be recognized as subject to variation. The cage 84 supports a ring gear 125 meshing with the driving pinion 30. The differential planet gears 126 are mounted upon radial stub shafts 128 and mesh with the differential side gears 130, 132 fast upon the axle shafts 24, 25, respectively.

All of the gears and antifriction bearings being of the tapered type, it will be appreciated that simple and accurate adjustment of all clearances may be effected by loosening the screw 110 to free clamping portion 89, moving the sleeve 95 to a desired position, inserting a snap ring 102 of the proper thickness to lock sleeve 95 against outward movement with respect to such position, and then tightening the clamping portion 89.

In Figs. 9, 10 and 11, a somewhat modified construction is shown, many of the components of which will be recognized as corresponding to those of the first-described embodiment, so that detailed redescription of such corresponding parts will not be required. Parts analogous to those already described are designated by like reference characters distinguished by the addition of the letter $a$ to each. The expanded central portion 22$a$, defining the outer banjo casing portion of the differential housing, is somewhat elongated to the left, in this embodiment, in proportion to the left-hand tapered portion 48$a$ and axle housing tube portion 20$a$, to provide a wider housing having substantial space therewithin to the left of the differential assembly. The clamping means for the bearing supporting sleeve 95$a$ is located in the differential housing liner cup in the space to the left of the differential assembly rather than outside of and to the left of the liner cup as in the first embodiment. The clamping parts are independent of the internal bracing tube 88$a$ for the tapered section 48$a$. The clamping assembly comprises a pair of diametrically, vertically divided clamping block sections 89$a$, 91$a$. The section 89$a$ extends forwardly within the differential casing and is welded to the inside of the reinforcing liner 42$a$ as indicated at 150. At its outer end, the stationary block portion 89$a$ bears against the inner end of the sleeve 88$a$, so that the block is rigidly held against outward displacement. The rear clamping section 91$a$ is separably secured to the fixed clamping block 89$a$ as by the clamping screws 110$a$ which are accessible through the rear cover 114$a$ when the latter is removed. The parts are so proportioned that when section 91$a$ is tightened by means of the screws 110$a$, the bearing supporting sleeve 95$a$ is rigidly frictionally held. The bearing sleeve is preferably also keyed in position by a snap ring 102$a$, corresponding to the snap ring 102 previously described, and it will be understood that simple and accurate adjustment of clearances may be effected by substituting rings of different thicknesses as previously described.

In Figs. 12 and 13, a further modification is shown which corresponds substantially to the last described embodiment, but wherein the clamping means for the adjustable bearing supporting sleeve 95$b$ is formed as an integral or one-piece clamping element mounted in the differential housing. In this embodiment, parts corresponding to those already described are designated by like reference numerals identified by the addition of the letter $b$ to each. The clamping member 89$b$ is formed in one piece and is shown as integral with sleeve 88$b$, although it might obviously be formed separately and welded thereto or otherwise secured. The clamping member is also provided with a rearwardly projecting portion 155, conforming to the interior contour of, and lying closely against, the inner wall of the reinforcing liner 42$b$, to which it may be welded as indicated at 150$b$. The annular clamping portion 89$b$ is radially split as indicated at 105$b$ upon a plane extending rearwardly and downwardly, and the portions above and below the split section are thickened as indicated at 106b, 108b, to accommodate the clamping screw 110b, which is so positioned as to be readily accessible when the cover 114b is removed. The slot 105b also extends for a substantial proportion of the length of the sleeve portion 88b.

In Figs. 14 to 17 inclusive, I have shown a further modification particularly adapted for use in heavy duty driving axles, such as are employed in trucks and buses. In this embodiment, parts analogous to those already described are designated by corresponding reference numerals distinguished by the letter c. The central banjo section 22c of the differential outer casing may be similarly expanded to ring form, but it is proportionately shorter in an axial (fore and aft) direction and is provided with at the front and rear needs thereof with inturned flanges 160, 161. The belled forward extension portion 34c of the outer casing is proportionately longer, and is outwardly flanged at its rear edge as shown at 163 to fit against the banjo flange 161, to which it is welded at 35c. These parts are securely attached to the exterior of a generally circular, cupped internal reinforcing liner 42c also formed of sheet metal and having an outturned rear flange 44c overlapping the inturned flange 160 of the banjo ring 22c and secured thereto by a peripheral weld as indicated at 45c. The front flange 161 of the banjo ring is secured at its inner edge to the exterior surface of the liner, as by means of the peripheral weld 162. The liner projects forwardly beyond the banjo ring, such forwardly projecting portion being of generally truncated conoidal form and terminating in a substantially flat transverse and vertical wall 164. The conoidal forwardly projecting portion is designated 165, and such portion fits closely within the belled extension 34c.

At its forward end, the belled extension 34c is provided with a cylindrical neck flange 170 which carries a collar 172, which in turn carries an antifriction bearing supporting sleeve 174 fitted thereinto. Collar 172 is relatively short and peripherally welded to the neck flange 170, as indicated at 175. At its forward end, the sleeve 174 is formed with a radially extending flange 178, and a front housing bell 180 is provided having a rear flange 182 lying against the flange 178, the flanges 178, 182 being adapted to be secured together and to the collar 172 by screw means as indicated at 184, Fig. 14. The sleeve 174 supports a pair of antifriction bearing assemblies 185, 186 which carry the driving shaft 32c, indicated as formed integrally with the driving pinion 30c. The antifriction bearings 185, 186 are oppositely tapered, their cupped outer race portions reacting against a central radially inwardly extending flange 188, while the inner race portions of the bearings are retained between the driving pinion 30c and an abutment washer 190 positioned by suitable lock nut means as 192 on the shaft. A driving universal joint fast upon the forward end of the shaft 32c is fragmentarily shown at 194 and a suitable lubricant retainer 195 is arranged between the front end of the bell 180 and the hub portion of the universal joint member 194.

The collar 172 is formed with a rearwardly extending upwardly opening trough-like scoop portion 196 carried by the top of the collar and projecting into the differential housing to a position close to the ring gear 125c. A pocket 198 forms an inward continuation of the scoop portion 196 and extends forwardly to a position approximately above the central flange 188 of the bearing supporting ring 174. An aperture 200 extends downwardly from the inner extremity of the pocket 198, and a continuation 202 of such aperture extends radially inwardly through the central flanged portion 188 of the ring 174 to the interior of such ring. The ring gear 125c tends to throw lubricant into the scoop 196, whence it may flow downwardly through the pocket 198 and passages 200, 202, to lubricate the bearings 185, 186. Lubricant which passes to the front through bearing 186 finds its way back to the main differential housing portion through longitudinal passages 204, 205 extending through the lower peripheral portions of flange 178 and collar 172, respectively.

A rearwardly extending pilot bearing hub portion 206 is formed as an integral axial extension of the pinion 30c and is journaled in an antifriction bearing 208 mounted in a ring 210 carried by the wall 164 at the front end of the reinforcing liner cup 42c.

The liner 42c is provided with substantially flat side portions 50c, 52c, Fig. 14, which extend perpendicularly across the inner ends of the axle tube portions. The rear open face of the liner 42c is flanged outwardly as at 44c and such rear flange is flat and adapted to receive the cover 114c as in the previously described embodiments.

Each of the flat side portions 50c, 52c of the liner 42c is provided with an internally threaded aperture as 62c, 64c, concentric with but substantially larger than the axle shaft. The differential cage 84c is carried by oppositely tapered antifriction bearings 82c, 96c at its ends, and separately adjustable take-up means is provided for each of these bearings. Such adjustable take-up means for the two bearings are the same, but symmetrically opposite in their arrangement, so that description of one will suffice. The inner race of the left side bearing assembly as 96c is carried by a reduced shoulder-defining portion 98c of the bearing supporting sleeve 95c, which corresponds to the sleeve 95 of the first described embodiment, but lies entirely within the differential housing. Sleeve 95c is releasably clamped in position by a clamping assembly generally corresponding to that of the embodiment of Figs. 9 and 10, and including a fixed clamping block portion 89c and a removable clamping cap portion 91c secured to the fixed portion 89c by a pair of relatively heavy clamping screws as 110c.

To provide for accurate axial adjustment of the positioning of the bearing supporting sleeve 95c when the clamping screws 110c are loosened, a hollow castellated sheet metal screw 225 is threadedly fitted into the tapped opening 62c in the side wall 50c of the liner 42c. The nut freely encircles the shaft 24c and is castellated at its inner end, as indicated at 226, the ends of the castellated portions being flat and bearing against the inner end of the sleeve 95c. A locking key as 228 is adapted to project into any one of the spaces between the castellated portions to lock the nut 225 against rotation, the key being secured to the rear face of the clamping cap 91c as by the screw 230. It will be seen that when the key is removed, the nut may be rotated by means of a drift or other implement inserted through the back opening of the housing to adjust the longitudinal position of the sleeve 95c and thereby vary the clearances between the operating parts.

The adjustable take-up means for the right-hand bearing 82c is of similar character, as stated, and the parts are designated by similar reference characters primed. As indicated in Fig. 16, the axle shafts of this embodiment may be of the full floating-type, and it will be appreciated that it is not necessary to pull the shafts in order to gain access to the bearing adjusting nut means 225, 225', since these parts can be adjusted through the back cover opening, as previously explained. The wheel hub 233 is journaled on the exterior of the tube 21c on a pair of spaced, opposed, tapered antifriction wheel bearings as 234, 235. The hub is closed at its outer end by the flange 238 formed as an integral head upon the outer end of the axle shaft, to which the hub is secured as by the screws 240, while at its inner end the hub is sealed with respect to the shaft by a suitable lubricant retainer as 242.

It will be observed that in each of the preferred embodiments of my invention herein disclosed the housing structure is so arranged as to facilitate the final boring and machining of all parts which must be finished in this manner to insure proper alignment. Thus in the embodiment of Fig. 1, for example, the inner surface portions of the sleeve 89 which carry the sleeve 95, and the inner surface of the tubular supporting portion 78 for the right side bearing assembly, as well as the shoulder portions 85 which locate the right side bearing, can all be bored and finished in a single operation after assembly of the housing structure. In all of the other embodiments also, the clamping portions are adapted to be bored in the same operation or at least in the same setting of the machine. In the embodiment of Fig. 14, both clamping portions may be bored out and the threaded openings for the castellated adjusting nuts 225, 225' may be bored and tapped in a single machine setting.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A housing structure for a driving axle and differential assembly comprising a pair of coaxial tubular portions formed of sheet metal, a differential case portion having a ring-like portion interposed between said tubular portions, and a generally cupped reinforcing liner also formed of sheet metal and constituting a part of said case portion and having a mouth portion and a base portion, said liner extending through and from the ring-like portion and being peripherally secured thereto, and the base portion projecting outwardly a substantial distance from the ring-like portion.

2. A structure as defined in claim 1 wherein said liner is provided with flattened side walls extending transversely across the inner ends of said tubular portions and apertured in substantially axial alignment with such tubular portions.

3. A structure as defined in claim 1 wherein said liner is provided with substantially flat side walls extending transversely across the inner ends of said tubular portions and apertured in substantially axial alignment with such tubular portions, and expanded portions of said tubular members secured to said liner and joined to more remote parts of said tubular portions by tapered integral walls.

4. A structure as defined in claim 1 wherein said liner is provided with flattened side walls extending transversely across the inner ends of said tubular portions and apertured in substantially axial alignment with such tubular portions, expanded portions of said tubular members secured to said liner and joined to more remote parts of said tubular portions by tapered integral walls, and a further reinforcing structural element of generally tubular form extending through such tapered walls and securing a reduced outer part of said tubular portion to one of said transverse walls.

5. A sheet metal housing structure for a driving axle and differential assembly comprising axially spaced aligned axle housing tubular portions expanded at their inner abutting ends to ring form, a cupped sheet metal liner extending through the ring and peripherally secured thereto, said cupped liner having a mouth and a bottom portion, the bottom portion projecting forwardly from the ring, portions intermediate with respect to and integral with both the ring and the tubular portions being of generally tapered form, and a front housing bell section also formed of sheet metal and enclosing the forwardly projecting bottom portion of the liner and secured both to the liner and the ring.

6. In combination with a structure as defined in claim 1, differential mechanism contained in said case portion, bearing means for supporting such mechanism including a combined radial and thrust-type antifriction bearing, means for axially adjustably moving said bearing to and fixing it in various positions including a bearing supporting sleeve coaxial with said tubular portions and projecting into said case to support said bearing and also extending through said liner into one of said tubular portions, and holding means secured to said structure and engageable with said support to releasably hold the latter against axial movement.

7. In combination with a structure as defined in claim 1, differential mechanism contained in said case portion, bearing means for supporting such mechanism including a combined radial and thrust-type antifriction bearing means for axially adjustably moving said bearing to and fixing it in various positions including a bearing supporting sleeve coaxial with said tubular portions and projecting into said case portion to support said bearing and also extending through said liner into one of said tubular portions, and holding means secured to said structure and engageable with said support to releasably hold the latter against axial movement, said holding means being secured to and reacting against said liner.

8. In combination with a structure as defined in claim 1, differential mechanism contained in said case portion, bearing means for supporting such mechanism including a combined radial and thrust-type antifriction bearing, means for axially adjustably moving said bearing to and fixing it in various positions including a bearing supporting sleeve coaxial with said tubular portions and projecting into said case portion to support said bearing and also extending through said liner into one of said tubular portions, holding means secured to said structure and engageable with said support to releasably hold the latter against axial movement, axle shafts extending freely through said tubular portions into said case portion, said bearing supporting sleeve having an outer end portion the inside diameter of which is substantially greater than the diameter of the shaft but less than the diameter of the tubular portion, and a tool-receiving portion formed upon such sleeve whereby such sleeve may be manipulated by means of a tool thrust through the tubular portion from the outer end thereof.

9. Means as defined in claim 5, including within said liner, such adjustable supporting means for adjustably supporting a side bearing means comprising a tubular bearing support projecting from the interior of said liner through said liner and into one of said tubular portions, and holding means located in said tapered portion and engageable with said tubular support.

10. Means as defined in claim 5, including means for adjustably supporting a side bearing within said liner, such adjustable supporting means comprising a tubular bearing support projecting from the interior of said liner through said liner and into one of said tubular portions, and holding means located in said liner.

11. In combination with a structure as defined in claim 1, differential mechanism contained in said case portion, bearing means for supporting such mechanism including a combined radial and thrust-type antifriction bearing, means for axially adjustably moving said bearing to and fixing it in various positions including a bearing supporting sleeve coaxial with said tubular portions and projecting into said case portion to support said bearing and also extending through said liner into one of said tubular portions, holding means secured to said structure and engageable with said support to releasably hold the latter against axial movement, axle shafts extending freely through said tubular portions into said case portion, said bearing supporting sleeve having an outer end portion the inside diameter of which is substantially greater than the diameter of the shaft but less than the diameter of the tubular portion, a tool-receiving portion formed upon such sleeve whereby such sleeve may be manipulated by means of a tool thrust through the tubular portion from the outer end thereof, said bearing supporting sleeve being provided with a peripheral groove located within said case portion, and an abutment ring in said groove reacting against the liner and shorter axially than said groove.

12. In combination with a structure as defined in claim 1, differential mechanism contained in said case portion, bearing means for supporting such mechanism including a combined radial and thrust-type antifriction bearing, means for axially adjustably moving said bearing to and fixing it in various positions including a bearing supporting sleeve coaxial with said tubular portions and projecting into said case portion to support said bearing and also extending through said liner into one of said tubular portions, holding means secured to said structure and engageable with said support to releasably hold the latter against axial movement, said liner portion being provided with a wall substantially coplanar with the rear peripheral face of said expanded portion, and said holding means including a releasable holding member accessible through said opening, whereby a single cover is adapted to extend over both the rear face of the ring and said opening.

13. In a housing structure for a driving axle and differential assembly, means for rotatably supporting a planet carrier in the housing structure upon side bearings of the antifriction-type, comprising a socket-defining portion rigidly carried by the housing structure in coaxial relation with the intended axis of rotation of the carrier and adapted to receive the outer race of a side bearing, and a spigot-like portion also carried by said housing structure in coaxial but spaced relation to said socket-defining portion and of substantially smaller diameter than said socket-defining portion to carry the inner race of the other side bearing.

14. Means as defined in claim 13 wherein said spigot-like portion is movable with relation to other parts of the housing structure, a slideway-defining portion supporting said spigot-like portion for axial sliding movement, and holding means including a holding element for securing said spigot-like portion in any of a plurality of positions of axial adjustment.

15. In combination with a structure as defined in claim 13, a carrier journaled in said housing structure for rotation upon said axis and having a spigot-like portion projecting into the socket-defining portion and adapted to support the inner race of the first-mentioned side bearing, said carrier also having a socket-like portion overhanging the first-mentioned spigot-like portion and adapted to support the outer race of said second-mentioned side bearing.

16. Means as defined in claim 13 wherein said spigot-like portion is movable with relation to other parts of the housing structure, a slideway-defining portion supporting said spigot-like portion for axial sliding movement, holding means including a holding element for securing said spigot-like portion in any of a plurality of positions of axial adjustment, and a clamping element secured to the housing structure and releasably engageable with said spigot-like portion.

17. Means as defined in claim 13 wherein said housing structure comprises a pair of tubular axle housing portions and an enlarged differential casing portion joined to said tubular portions by inclined walls, said socket-defining portion being carried by angular bracing walls rigidly connected to said previously mentioned walls at a plurality of spaced points.

18. Means as defined in claim 13 wherein said housing structure comprises a pair of tubular axle housing portions and an enlarged differential casing portion joined to said tubular portions by inclined walls, and angular bracing walls rigidly connected to said previously mentioned walls at a plurality of spaced points.

19. Means as defined in claim 13 wherein said housing structure comprises a pair of tubular axle housing portions and an enlarged differential casing portion joined to said tubular portions by inclined walls, said spigot-like portion being carried by angular bracing walls rigidly connected to said previously mentioned walls at a plurality of spaced points.

20. Means as defined in claim 13 wherein said housing structure comprises a pair of tubular axle housing portions and an enlarged differential casing portion joined to said tubular portions by inclined walls, said socket-defining portion and said spigot-like portion being carried by angular bracing walls rigidly connected to said previously mentioned walls at a plurality of spaced points.

21. Means as defined in claim 13 wherein said housing structure comprises a pair of tubular axle housing portions and an enlarged differential casing portion joined to said tubular portions by inclined walls, said spigot-like portion being carried by angular bracing walls rigidly connected to said previously mentioned walls at a plurality of spaced points, said angular bracing walls including a sleeve portion coaxial with said axis, said spigot-like portion being slidable in said sleeve portion.

22. In a structure as defined in claim 1, a bell section enclosing and extending outwardly beyond the projecting base portion of the liner and having a neck part spaced outwardly from the base portion and adapted to support a pinion shaft, the space within the bell section beyond the base portion of the liner being sufficient to accommodate a pinion, the base portion of the liner having a ring gear opening therein, and a bearing supporting portion carried by said base portion of the liner in substantial alignment with the neck part of the bell section.

23. A housing structure for a driving axle and differential assembly comprising a pair of coaxial tubular portions formed of sheet metal, a differential case portion of ring-like form interposed between said tubular portions, a generally cupped reinforcing liner also formed of sheet metal and constituting a part of said case portion and projecting through and from the ring-like portion and secured thereto, and a front housing bell section also formed of sheet metal and enclosing the forwardly projecting part of the liner and secured both to the liner and the ring-like portion.

ROSCOE C. HOFFMAN.

REFERENCES CITED

The following references are of record in the file of this patent:

UNITED STATES PATENTS

| Number | Name | Date |
|---|---|---|
| 1,076,560 | Duffy | Oct. 21, 1913 |
| 1,291,009 | Johnson | Jan. 14, 1919 |
| 1,331,662 | Neuteboom | Feb. 24, 1920 |
| 1,391,294 | Barbara | Sept. 20, 1921 |
| 1,955,824 | Mogford | Apr. 24, 1934 |
| 2,478,180 | Buckendale | Aug. 9, 1949 |

FOREIGN PATENTS

| Number | Country | Date |
|---|---|---|
| 185,997 | Great Britain | Sept. 21, 1922 |

Certificate of Correction

Patent No. 2,563,680                                            August 7, 1951

ROSCOE C. HOFFMAN

It is hereby certified that error appears in the printed specification of the above numbered patent requiring correction as follows:

Column 7, line 17, for "with" read *both*; line 18, for "needs" read *ends*; column 9, line 61, for "flattened" read *substantially flat*; column 10, line 45, after "bearing" insert a comma; column 11, line 7, strike out "means for adjustably supporting a side bearing" and insert the same before "within" in line 6, same column;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*